US006262217B1

(12) United States Patent
Tallmadge et al.

(10) Patent No.: US 6,262,217 B1
(45) Date of Patent: Jul. 17, 2001

(54) POLYURETHANE COMPOSITIONS

(75) Inventors: Jack N. Tallmadge, Fairview, PA (US); Ashish P. Diwanji, Pickerton, OH (US); Mark A. Weih, Holly Springs, NC (US); Walter C. Wilhem, Erie, PA (US)

(73) Assignee: Lord Corporation, Cary, NC (US)

( * ) Notice: Subject to any disclaimer, the term of this patent is extended or adjusted under 35 U.S.C. 154(b) by 0 days.

(21) Appl. No.: 08/990,399

(22) Filed: Dec. 15, 1997

(51) Int. Cl.[7] .......................... C08G 18/62; C08G 18/69; C08G 18/10; C09J 175/14
(52) U.S. Cl. ................................ 528/64; 528/59; 528/61; 528/63; 528/67; 528/75; 528/85; 528/905
(58) Field of Search ................... 528/59, 61, 63, 528/64, 67, 75, 85, 905

(56) References Cited

U.S. PATENT DOCUMENTS

| 3,055,952 | 9/1962 | Goldberg | 568/857 |
|---|---|---|---|
| 3,175,997 | 3/1965 | Hsieh | 525/385 |
| 3,674,743 | 7/1972 | Verdol et al. | 528/68 |
| 3,752,790 | 8/1973 | McShane, Jr. et al. | 528/63 |
| 3,830,784 | 8/1974 | Manino et al. | 525/55 |
| 3,897,386 | 7/1975 | Sanda, Jr. | 525/131 |
| 3,962,511 | 6/1976 | Foti | 156/137 |
| 3,963,681 | 6/1976 | Kaneko et al. | 528/61 |
| 3,987,012 | * 10/1976 | Statton | 528/64 |
| 4,020,125 | * 4/1977 | Suzuki et al. | 528/59 |
| 4,089,822 | 5/1978 | Vial et al. | 524/378 |
| 4,095,404 | 6/1978 | Babayan | 57/164 |
| 4,234,714 | * 11/1980 | Earing et al. | 528/59 |
| 4,507,430 | 3/1985 | Shimada et al. | 524/839 |
| 4,556,703 | 12/1985 | Megna et al. | 528/49 |
| 4,812,524 | * 3/1989 | Baghdachi | 525/194 |
| 5,234,996 | * 8/1993 | Mori et al. | 528/59 |
| 5,288,797 | * 2/1994 | Khalil et al. | 528/59 |
| 5,302,755 | 4/1994 | Schaerfl, Jr. et al. | 564/440 |
| 5,486,570 | 1/1996 | St. Clair | 525/123 |
| 5,530,085 | * 6/1996 | Giorgini | 528/59 |
| 5,672,653 | 9/1997 | Frisch et al. | 524/591 |

FOREIGN PATENT DOCUMENTS

| 2 749 017 | 11/1997 | (FR) . |
|---|---|---|
| 59-210928 | 11/1984 | (JP) . |
| WO 93/02856 | 2/1993 | (WO) . |

OTHER PUBLICATIONS

Database WPI Section Ch, Week 8327 Derwent Publications Ltd., London, GB; Class A93, AN 83–703572 XP002098839 & JP 58 091873 A (Hodogaya Kenzai Kog) May 31, 1983.
Patent Abstracts of Japan, vol. 007, No. 011 (C–145), Jan. 18, 1983 & JP 57 168972 A (Nitsushin Kogyo KK; Others: 01), Oct. 18, 1982.
Database WPI Section Ch, Week 8822, Derwent Publications Ltd., London, GB; Class A12, AN 88–152758 XP002098840 & JP 63 095283 A (Idemitsu Petrochem Co) Apr. 26, 1988.
English Abstract of JP 54127928, Oct. 4, 1979.
English Abstract of JP 59057740, Apr. 3, 1984.
Handbook of Adhesives (Edited by Irving Skeist, 3d Ed. 1990), pp. 366, 371, 380.
B.B. Idage et al., J. Applied Poly. Sci. 28, 3559–3563 (1983).
M. Zachariasiewicz, Poly BD Resins High Performance Materials for Encapsulates & Sealant, ASE 85 Bulletin, pp. 18–32, 1985.
General Bulletin, poly bd® resins, ARCO/Chemical Company, pp. 2–8 (1978).
N.S. Schneider et al., "Structure and Properties of Polybutadiene Polyurethanes" from Advances in Urethane Science & Technology, pp. 49–74 (1981).
P.W. Ryan, J. Elastoplastics, vol. 3, pp. 57–71 (1971).

* cited by examiner

Primary Examiner—Rabon Sergent
(74) Attorney, Agent, or Firm—Wayne W. Rupert; Miles B. Dearth

(57) ABSTRACT

Polyurethane compositions including the reaction product of a polyurethane prepolymer component including (a) at least one isocyanate-terminated polyalkadiene prepared by capping hydroxy-terminated polyalkadiene having a molecular weight from about 1500 to about 5000 grams per mol (g/mol) with isocyanate; and (b) at least one additional isocyanate-terminated polyalkadiene prepared by capping hydroxy-terminated polyalkadiene having a molecular weight from about 500 to about 1500 g/mol with isocyanate with a curative component. The compositions exhibit numerous useful properties, such as low glass transition temperature ($T_g$) high temperature stability, low viscosity at room and elevated temperatures, flexibility and flat dynamic mechanical properties versus temperature.

15 Claims, No Drawings

POLYURETHANE COMPOSITIONS

FIELD OF THE INVENTION

The present invention relates to polyurethane compositions and more particularly to two-component polyurethane compositions.

BACKGROUND OF THE INVENTION

Resorcinol-formaldehyde-latex (RFL) based adhesives are widely used to adhere textile substrates, such as fabrics and multifilament cords, to an elastomer, particularly in the tire, belt, and similar industries. RFL adhesives can be formulated to adhere to a variety of textile substrates and elastomers. RFL adhesives also can exhibit low glass transition temperature (low $T_g$), high thermal resistance, flexibility, and other properties desirable in belt structures and in similar applications. Despite these and other advantages of RFL adhesives, there can be environmental concerns associated with RFL adhesives.

Polyurethane compositions can be useful in rubber-to-fabric adhesive applications. See I. Skiest, "Handbook of Adhesives" (Chapman & Hall 1990), page 366. For example, Skiest discusses liquid isocyanate-terminated prepolymers prepared from diisocyanates and a polybutadiene glycol useful as a rubber-fabric adhesive. Other patents and articles discuss polyurethane compositions prepared from hydroxyl-terminated polybutadienes for various applications, such as elastomers, molded products, and the like. See U.S. Pat. No. 3,055,952 to Goldberg; U.S. Pat. No. 3,175,997 to Hsieh; U.S. Pat. No. 3,674,743 to Verdol, et al.; U.S. Pat. No. 4,507,430 to Shimada, et al.; U.S. Pat. No. 5,486,570 to St. Clair; Japanese Patent Application No. 59/210928; see also B. B. Idage et al., J.App.Poly.Sci. 28, 3559–3563 (1983); M. Zachariasiewicz, "Poly BD Resins: High Performance Materials for Encapsulants and Sealants," ASE Proceedings 1985; Arco Chemical Co. General Bulletin titled "Poly BD Resins: Functional Liquid Polymers" (1978); N. S. Schneider et al., Advances in Urethane Science & Technology 8:49–74 (1981); and P. W. Ryan, J. Elastoplastics 3:57–71 (1971).

Typically, however, such compositions can exhibit certain properties to the exclusion of other desired characteristics. For example, a particular composition can have good dynamic mechanical properties, such as low heat generation, but suffer poor adhesion properties, or other desired properties.

SUMMARY OF THE INVENTION

The present invention provides polyurethane compositions which exhibit several desirable properties. The compositions can exhibit a flat (stable) modulus response over a broad range of temperatures. The compositions also can have desirably low glass transition temperature ($T_g$) and high temperature stability. Thus the compositions can be useful over a broad range of temperatures. The compositions also can exhibit good flexibility and good dynamic mechanical properties, such as low G" (low heat generation). In addition, the compositions of the present invention are formaldehyde-free, and thus can be environmentally acceptable. Still further, the composition can have low viscosity at room and elevated temperature, which can be useful in various applications.

The polyurethane compositions of the invention are particularly useful as an impregnating bonding agent for textile substrates, such as fabrics and multifilament cords. The composition preferably has a sufficiently low viscosity upon application so that it can readily penetrate into and achieve good bonding of individual filaments of a textile substrate to one another to provide a coherent structure. Good inter-ply adhesion can be achieved without adversely affecting the desired flexibility of the cord, due to the flexible nature of the composition. The resultant bonded cord can in turn can be adhered to vulcanizable elastomeric rubbers to provide a composite structure useful in tires, belts, and the like. The polyurethane compositions are also useful in other applications, such as cast polyurethane products, flexible composites, elastomeric/metal constructions, and the like.

The polyurethane compositions of the invention include a polyurethane prepolymer formed of a mixture of isocyanate-terminated (or capped) polyalkadienes of varying molecular weights. The majority component of the polyurethane prepolymer is an isocyanate-terminated polyalkadiene prepared by capping a hydroxy-terminated polyalkadiene with isocyanate. The isocyanate caps the hydroxyl groups of the polyalkadiene to form urethane linkages. The majority component is characterized as having a molecular weight sufficient to impart the desirable properties of the polyalkadiene component thereof to the polyurethane composition, such as low $T_g$, flexibility, and the like. The minority component has a molecular weight suitable to increase isocyanate levels sufficient to impart the desired degree of adhesion.

The majority component of the polyurethane prepolymer is preferably an isocyanate-terminated polyalkadiene prepared by capping a hydroxy-terminated polyalkadiene having a molecular weight from about 1500 to about 5000, preferably at least about 2000, grams per mol (g/mol) with isocyanate. The polyurethane prepolymer also includes at least one additional isocyanate-terminated polyalkadiene prepared by capping hydroxy-terminated polyalkadiene having a molecular weight from about 500 to about 1500, preferably at least about 1000, g/mol with isocyanate.

The polyurethane compositions of the invention also include a curative component, such as an aromatic diamine compound. Typically, the polyurethane prepolymer component and the curative component are stored separately and combined prior to use.

DETAILED DESCRIPTION OF THE INVENTION

The polyurethane compositions of the invention include the reaction product of a polyurethane prepolymer component and a curative component. The polyurethane prepolymer component includes a blend of isocyanate-terminated polyalkadienes. As used herein, the term "hydroxy-terminated polyalkadiene" refers to hydroxy-terminated homopolymers of conjugated dienes, such as butadiene, isoprene, and copolymers thereof. The hydroxy-terminated polyalkadiene can be saturated or unsaturated. The saturated versions of hydroxy-terminated polyalkadienes can provide improved oxidation resistance.

The prepolymer component includes about 50 to about 99 percent by weight, preferably about 75 to about 95 percent by weight, based on the total weight percent of the prepolymer component, of an isocyanate-terminated polyalkadiene prepared by capping a hydroxy-terminated polyalkadiene having a number average molecular weight from about 1500 to about 5000, preferably at least about 2500, grams per mol (g/mol) with isocyanate. The prepolymer also includes about 1 to about 50 percent by weight, preferably about 5 to about 25 percent by weight, based on the total weight of the prepolymer, of at least one other isocyanate-terminated polyalkadiene prepared by capping a hydroxy-terminated polyalkadiene having a molecular weight number average from about 500 to about 1500, preferably at least about 1000, g/mol with isocyanate.

Generally, the polyalkadienes are terminated with hydroxyl groups and can have a hydroxyl functionality of about 1.5 to about 3. The hydroxy-terminated polyalkadienes can be non-hydrogenated (i.e., have a hydrogen saturation degree of carbon to carbon double bonds in the hydroxy-terminated polyalkadiene of less than about 50%). Saturated polyalkadienes having a hydrogen saturation degree of at least about 80%, and higher, and mixtures of saturated and unsaturated compounds can also be used. The saturated polyalkadienes can impart additional advantageous properties, such as increased UV and oxidation resistance. The polyalkadienes can be saturated using techniques known in the art, for example, by subjecting the polyalkadiene to hydrogenation reaction in the presence of a catalyst such as nickel, vanadium, or Raney nickel.

The hydroxyl groups of the hydroxy-terminated polyalkadienes are capped with isocyanate functional groups using suitable diisocyanate compounds known in the art, including aliphatic, cycloaliphatic and aromatic diisocyanates. Preferably, the diisocyanate is a symmetric diisocyanate. Exemplary diisocyanates include toluene diisocyanate (TDI), 1,5-naphthalene diisocyanate, phenylene diisocyanate, diphenyl methane diisocyanate (MDI), xylene diisocyanate, isophorone diisocyanate (IPDI), and the like, and mixtures thereof. These diisocyanates can promote excellent hard-soft block phase separation, which in turn can contribute to low $T_g$, high $T_m$, flat G" and Tan δ. The inventors have found that TDI is especially useful to maintain relatively low viscosity, due to the selectivity of TDI, which can promote hydroxyl capping with minimal chain extention. MDI is useful as well, particularly in applications which can tolerate viscosity increases.

Isocyanate can be added to a mixture of hydroxy-terminated polyalkadienes under conditions sufficient to cap terminal hydroxy groups of the polyalkadienes. Alternative, isocyanate can be added to individual polyalkadienes separately to end-cap each polyalkadiene component, and the resultant isocyanate-terminated polyalkadienes can then mixed together in the desired ratios. Preferably excess isocyanate is added over and above that amount required for a 2:1 NCO/OH ratio, preferably in an amount sufficient to provide a NCO/OH ratio of at least about 4:1, or higher. Excess isocyanate can be removed, for example, by thin film evaporation (for example TDI), or can remain in the prepolymer component (for example when using MDI).

The curative component of the polyurethane composition of the invention can include aromatic diamines. Exemplary aromatic diamines include, but are not limited to, 3,5-dimethylthio-2,4-toluene diamine, 4,4'-methylene-bis(2-chloroaniline), 1,3-trimethylene glycol-(p-amino benzoate), 1,2-bis(2-amino-phenyl thioethane), 4,4'-methylene dianiline, 4,4'-methylene-bis(3-chloro-2,6-diethylaniline, 2,6-dichloro-p-phenylene diamine, 2,6-dibromo-p-phenylene diamine, polytetramethyleneoxide-di-p-aminobenzoate, and the like, and mixtures thereof. Currently preferred aromatic diamines are 3,5-dimethylthio-2,4-toluene and 4,4'-methylene-bis(3-chloro-2,6-diethylaniline. Symmetric aromatic diamines are particularly useful with symmetric diisocyanate end caps as they promote excellent hard-soft block phase separation, which gives excellent thermal stability as well as enhances the low $T_g$ properties of the polyalkadienes.

To minimize prepolymer molecular weight, and thus viscosity, polyurethane prepolymers are prepared by capping hydroxy-terminated polyalkadienes with an excess amount of isocyanate as described above. The resultant reaction product (prepolymer) can then be reacted further with a curative, such as an aromatic diamine. Conventional polyurethane catalysts can also be used, including, but not limited to, mono- and di-carboxylic acids and their metal salts, such as glutaric acid, pimelic acid, azeleic acid, propionic acid, valeric acid, caprioc acid, caprylic acid, myristic acid, palmitic acid, stearic acid, stannous stearate, chromium naphthalate, molybdenum naphthalate, and the like. Also useful are tertiary amines, such as triethylene diamine, dimethyl oleylamine, N-ethylmorpholine, and the like, and anhydrides of carboxylic acids, such as stearic anhydride, phthalic anhydride, and the like. Catalysts are typically used in amounts from about 0.01% to about 1% by weight, based on the weight of the curative.

The compositions of the invention are normally provided as two-package adhesive systems, with the packages being mixed at the time of use. Typically, the first package includes at least one polyurethane prepolymer, and the second package includes at least one curing agent, each as described above. An exemplary two-package system in accordance with the invention includes:

(I) a first package comprising a polyurethane prepolymer comprising:
  at least one isocyanate-terminated polyalkadiene prepared by capping hydroxy-terminated polyalkadiene having a molecular weight from about 1500 to about 5000 grams per mol (g/mol) with isocyanate; and
  at least one additional isocyanate-terminated polyalkadiene prepared by capping hydroxy-terminated polyalkadiene having a molecular weight from about 500 to about 1500 g/mol with isocyanate; and
(II) a second package comprising a curingly effective amount of at least one polyurethane aromatic diamine curing agent which is reactive with said prepolymer when the first and second packages are mixed. Preferably the second package includes about 75 to about 100 percent by weight of the curing agent, based on the total weight of the second package.

Generally, the polyurethane systems include the first and second packages in conventional amounts, for example, to achieve a target $NCO/NH_2$ ratio of from about 0.9 to about 1.2, preferably about 1.05. Although the compositions of the invention are normally provided as two-package adhesive systems, the compositions are also useful in other types of systems.

The adhesive can be used to bond a variety of substrates including metallic, ceramic, glass, and organic substrates. In this application, the mixed adhesive can be applied to one or both surfaces to be joined, for example by spraying, dipping, brushing, and the like, and the surfaces placed in contact with each other. Suitable metallic substrates include any of the common structural metals including iron, steel, including stainless steel, lead, aluminum, copper, brass, bronze, Monel metal, nickel, zinc, and the like. The organic substrates include leather and textile materials.

For example, after mixing the individual parts, preferably the mixed adhesive system has a sufficiently low viscosity that it can readily penetrate into and achieve good bonding of individual filaments of a textile substrate to one another to provide a coherent structure. Alternatively, the mixed system can be heated to the desired application temperature to control viscosity. In a currently preferred embodiment of the invention, the mixed adhesive system is used as an impregnating adhesive to penetrate into the fibrous structure of a textile substrate, such as polyester, polyamide, rayon and cotton fabrics and multifilament cords, and the like. The textile substrates can also include glass fibers or filaments. The adhesive penetrates into the fibrous textile substrate structure to bond individual fibers to one another to form a coherent, yet flexible, structure. For example, the mixed adhesive system can be applied to multifilament cords by pultrusion.

The amount of polyurethane composition applied will vary with the application method, material to which applied, and other substrates to be bonded thereto. Curing may be accomplished under ambient conditions, e.g., room temperature, or by the use of heat or forced air. Typically, the composition is cured for about thirty minutes at about 250° F., although cures times and cure temperatures outside this can also be used.

Substrates to which the polyurethane composition of the invention has been applied, including impregnated textile substrates, can be bonded using known solvent and/or aqueous-based adhesive compositions to a wide variety of vulcanizable elastomers, including natural rubber; styrene-butadiene rubber (SBR) of both high and low durometer grades and oil-extended types; neoprene (G and W types); butyl rubber; chlorobutyl rubber; ethylene-propylene terpolymer rubber; butadiene-acrylonitrile rubber; chlorosulfonated polyethylene rubber; polyurethane rubber; polyacrylate rubber, ethylene-propylene copolymer rubber; and the like. Exemplary solvent based adhesives are disclosed in U.S. Pat. Nos. 3,830,784 and 3,282,883, and exemplary aqueous based adhesives are disclosed in published PCT Application No. WO 97/00904, the entire disclosure of each is hereby incorporated by reference.

Two or more layers can be bonded together to form a multilayered structure. For example, a polyurethane adhesive impregnated textile substrate can be sandwiched between and bonded to outer vulcanizable elastomer layers to form a composite multilayer structure. Additional adhesive treated substrates, such as a fabric backing, can also be applied to an outer surface of the multilayered structure. Exemplary articles which can be formed using the polyurethane adhesives of the invention include tires, as well as any of a wide variety of reinforced belts, for example synchronous and serpentine belts for the automotive industry and other industrial applications, which can include a fiberglass reinforcing layer sandwiched between outer vulcanized rubber layers, hoses, air springs, and the like.

The present invention will be further illustrated by the following non-limiting examples.

EXAMPLE 1

Isocyanate-capped Prepolymer Preparation

The building blocks of the prepolymer were as follows:

R45HT, a predominantly 1,4 added hydroxyl-terminated polybutadiene from Elf Attochem having a functionality of about 2.5 and a molecular weight (MW) of about 2800 g/mole;

R20LM, a predominantly 1,4 added hydroxyl-terminated polybutadiene from Elf Attochem having a functionality of about 2.5 and a molecular weight (MW) of about 1230 g/mole; and a pure 2,4 isomer of TDI (toluene diisocyanate), commercially available as TDS from Mobay.

To prepare the prepolymer, R45HT and R20LM were reacted with excess TDI to cap each hydroxyl with diisocyanate with minimal chain extention. This minimizes molecular weight and thus the viscosity of the final prepolymer.

To cap the hydroxyl groups with minimal chain extention, 75 weight percent (wt. %) R45HT and 25 wt. % R20LM were charged to a reaction vessel and heated to 80–100° C., then held under vacuum to remove water and gas. This polyol blend was then removed and TDS was added to the reaction vessel at ambient conditions under nitrogen. The polyol blend was then added (also under nitrogen) and the mixture heated to 65° C. and held for an hour. TDS was added to polyol in excess to cap hydroxyls (4:1 molar proportion TDS:polyol). This excess combined with the selective reactivity of the 2,4 isomer are favorable to capping versus chain extention. The product was 9–10% NCO and about 13.5% free TDI.

This material was stripped of free TDI using thin film evaporation. The final stripped prepolymer had a viscosity of about 20,000–40,000 cps, more typically about 35,000 cps, determined using a Brookfield LV-II viscometer. % NCO was 3.5–4.0, typically near 3.9%. Free TDI was below 0.1%, typically about 0.02%.

EXAMPLE 2

Properties of Composition

Polyurethane prepolymers prepared as described in Example 1 above were heated to 80–1000° C. and then mixed with E-300 (3,5-dimethylthio-2,4-toluenediamine) at stoichiometric amounts (NCO/amine) of 0.85, 1.0 and 1.15. The mixture was stirred and then dumped into a 6"×6"×⅛" mold. When the material began to gel, the mold was closed and cured for thirty minutes at 100° C. The pad was then demolded. Finally the pad was cured overnight or 16 hours at 121° C. Test samples measuring ½×5"×⅛" were cut from the pads.

Dynamic Mechanical Analysis

Dynamic mechanical analysis was conducted on a Rheometric RDA-II. Samples were loaded with 0.3% strain, torsionally strained at 1 Hz and dynamic modulus measured for a temperature sweep from −100° C. to 200° C. at 10° increments. The $T_g$ was low (about 60° C.) and G' and tan delta were relatively flat from −30° C. to 150° C.

Tensile Properties

Test samples were prepared as described above, except that the samples were cured for 30 minutes at 121° C. and postcured at 121° C. for 12 hours. NCO index (NCO/amine) was 1.03–1.05.

Test samples were loaded into an Instron tester and pulled in tensile at a rate of 20" per minute until the specimens broke. Tensile strengths (psi) at 100% E (elongation), 200% E and break plus % elongation at break were recorded. The results are set forth below in Table 1. These results are average values from about 10 samples cut from the same pad.

TABLE 1

| Sample | Tensile (psi) at 100% E | Tensile (psi) at 200% E | Tensile (psi) at break | Elongation (%) at break |
|--------|-------------------------|-------------------------|------------------------|--------------------------|
| A | 1067 | 1283 | 1610 | 254 |
| B | 1098 | 1445 | 1664 | 268 |
| C | 1076 | 1474 | 1527 | 214 |
| D | 1068 | 1467 | 1525 | 209 |
| E | 1084 | 1422 | 1655 | 275 |
| F | 1147 | 1491 | 1782 | 263 |
| G | 1122 | 1464 | 1648 | 287 |
| H | 1106 | 1437 | 1730 | 252 |

Viscosity of Pre-polymer

Viscosity versus temperature was measured using a Brookfield DV-II viscometer equipped with a thermostatted sample cell. Prepolymer prepared as described in Example 1 above was placed in the cell at 30° C. and viscosity was measured at 10°C. increments up to 100° C. or 120° C. Shear rate was varied to keep % torque between a 40% to 100% range. The results indicate estimated viscosity over a large temperature and viscosity range. Shear rates varied between 0.3 and 6 rpm. The results were as follows (each value estimated Brookfield viscosity in cps: 27,900 at 38° C.; 11,000 at 45° C.; 7310 at 55° C.; 2420 at 65° C.; 1560 at 75° C.; 1050 at 85° C.; 745 at 95° C.; 544 at 105°; and 431 at 115° C.

EXAMPLE 3

Adhesion Applications

A woven polyester fabric formed of untreated polyester cords (composed of three plies each, each ply about 400 fibers approximately 25 microns in diameter, total cord diameter about 0.03 inches) was cut into sections measuring 2"×14". A composition prepared as described above in Example 2 (prepolymer+amine curing agent) was heated to 100° C. (at application, impregnant temperature is estimated to be 70–90° C.) and then spread on the tape with a tongue depressor. Adhesive is applied to both sides of the tape with minimal excess, and tapes were wiped clean as possible with tongue depressor. The tapes were air dried for thirty minutes and then oven dried for thirty minutes at 250° F. CH-233X (diluted with xylene in 80:20 ratio), a solvent-based covercoat commercially available from Lord Corporation, was applied to the dried/cured impregnant coated tape with a single dip application. Following a thirty minute air dry, the tapes were oven dried for thirty minutes at 250° F.

Test specimens were prepared by cutting the 14 inch tape in half to provide 2 tape samples. Neoprene elastomer was milled to a thickness of 0.03 inches (0.75 mm) and was cut into pieces slightly longer and wider than the tapes. The specimens were built by layering rubber-tape-rubber-tape-rubber and molded for thirty minutes at 320° F. in a bladder mold with 80 psi pressure.

To test adhesion, the specimens were cut lengthwise to harvest the center 1 inch wide test strip (5" plus in length). The sandwich was pulled apart by gripping rubber-tape and rubber-tape-rubber into grips on a tensile tester (a non-adhesive spacer is used during preparation to separate layers for testing). The pull rate was 2 inches per minute and the peak load, average load, % rubber retention and failure modes were recorded. The results are set forth below in Table 2. The % NCO of the prepolymer sued was 3.89 and NCO/amine ratios are shown in Table 2.

TABLE 2

| NCO/amine Ratio | Room Temperature Peel | | 100° C. Peels | |
|---|---|---|---|---|
| | Average | Peak | Average | Peak |
| 1.0 | 60 pli | 68 pli | 28 pli | 34 pli |
| 1.1 | 65 pli | 68 pli | 30 pli | 33 pli |

Failure mode for all samples was 100R (cohesive with the rubber). The polyurethane composition adequately bonds the polyester fabric and is adhered to by CH-233X.

EXAMPLE 4

Properties of Isocyanate-capped Prepolymer Chain Extended with MOCA

Polyurethane prepolymers prepared as described in Example 1 above were heated to 80–100° C. and then mixed with 4,4'-methylene-bis-(2-chloroaniline) (MOCA) (melted for thirty minutes at 250° F.) at 1.05 NCO/amine (150 g prepolymer at 3.90% NCO to 17.64 g MOCA). The mixture was stirred and then dumped into a 6"×6"×⅛" mold. When the material began to gel, the mold was closed and cured for thirty minutes at 100° C. The pad was then demolded. Finally the pad was cured, one set for 2 hours at 100° C. and a second set for 24 hours at 100° C. Test samples measuring ½"×5"×⅛" were cut from the pads.

Dynamic Mechanical Analysis

Dynamic mechanical analysis was conducted on a Rheometric RDA-II. Samples were loaded with 0.3% strain, torsionally strained at 1 Hz and dynamic modulus measured for a temperature sweep from −100° C. to 200° C. at 10° increments. G' was higher the prepolymers cured with E-300, indicating a higher modulus. Similar $T_g$ and flatness of G' and tan delta were observed. Tm appears to be higher (phase separation).

Tensile Properties

Test samples were prepared as described above in Example 2 using the prepolymer cured with MOCA. Tensile properties were observed using the techniques as described in Example 2. Chain extending with MOCA produced a higher modulus, stiffer elastomer than with E-300. The results are set forth below in Table 3.

TABLE 3

| Sample | Tensile (psi) at 100% E | Tensile (psi) at 200% E | Tensile (psi) at break | Elongation (%) at break |
|---|---|---|---|---|
| I | 1660 | — | 1980 | 156 |

EXAMPLE 5

Preparing Polybutadiene-Toluene Diisocyanate (TDI) Prepolymers Chain Extended with 3,5-Dimethylthio-2,4-Toluenediamine Polyurethane prepolymers A, B, and C were prepared using polybutadiene polyols A, B and C, respectively, capped with toluene diisocyanate (TDI). Polyol A is a predominately 1,4-added hydroxyl-terminated polybutadiene commercially available from Elf Atochem, having a hydroxyl functionality of about 2.5 and a molecular weight (MW) of about 2800 g/mole. Polyol B is a predominately 1,2-added hydroxyl-terminated polybutadiene commercially available from Nisso, having a hydroxyl functionality of about 1.6 and a MW of about 2000 g/mole. Polyol C is a predominately 1,4-added hydroxy-terminated polybutadiene from Elf Atochem, having a hydroxyl functionality of about 2.5 and a MW of about 1230 g/mole.

Prepolymers A and B were prepared by charging a reaction kettle with polyols A and B, heating the polyol to 80° C., degassing, and then bulk adding isocyanate (toluene diisocyanate TD80, which is an 80:20 blend of the 2,4:2,6 isomers). TD80 NCO/OH ratio was 2.15:1 to add TDI to each end of the polyol, i.e., to end cap the polyol. Final percent NCO functionalities were between 3.5 and 4.0.

Prepolymer C was made following the reverse addition. TD80 was charged to the kettle and degassed and polyol C was added slowly. NCO/OH ratio was 2:1 and the resulting percent NCO functionality was typically 5.1%.

Prepolymers A, B, and C were evaluated independently and also in the form of blends. Blends described throughout are prepared by mixing together prepolymers as described above, and not by end capping polyol blends.

EXAMPLE 6

Properties of Polybutadiene-Toluene Diisocyanate (TDI) Prepolymers Chain Extended with 3.5-Dimethylthio-2,4-Toluenediamine Polyurethane prepolymers A, B, and C prepared as described above in Example 5 were heated to 80–100° C. and then mixed with E-300 (3,5-dimethylthio-2,4-toluenediamine, commercially available from Ethyl Corp. as Ethacure 300) at a stoichiometry of 1.0. The mixture was stirred thoroughly by hand and then transferred to a 6"×6"×⅛" mold. When the material began to gel, the mold was closed and cured for 60 minutes at 250° F., after which the pad was demolded. Finally, the pad was cured overnight for 16 hours at 250° F. Test samples of ½"×5"×⅛", were cut from the pad.

The samples were evaluated for glass transition temperature ($T_g$) using a Rheometrics RDA-II. The sample was loaded with 0.3% strain and torsionally strained at a 1 Hz frequency. Dynamic modulus was measured for a temperature sweep from –100° C. to 200° C. at 10° C. increments. Results are set forth in Table 4 below. Sample A refers to samples prepared using polyurethane prepolymer A, sample B refers to samples prepared using polyurethane prepolymer B, sample C refers to samples prepared using polyurethane prepolymer C, and ratios of A:B and A:C indicate blends of prepolymers A and B, and of prepolymers A and C, respectively.

TABLE 4

| SAMPLE | ESTIMATED $T_g$ (° C.) |
|---|---|
| A | –60 |
| B | 15 |
| 75%A:25%B | –40 |
| 60%A:40%B | –20 |
| 50%A:50%B | –15 |
| 25%A:75%B | 5 |
| C | –50 |
| 75%A:25%C | –60 |

Higher molecular weight appears to give flatter modulus versus temperature. The 1,4 added polybutadienes (A and C) have lower $T_g$. Blending approaches appear to provide material with a single average $T_g$.

Test samples were then loaded into an Instron tester and pulled in tensile at 20 inches per minute until the specimens broke. Elongation and tensile at break ($E_B$ and $T_B$) were recorded. The results shown (Table 5 below) are an average of 5 samples.

TABLE 5

| SAMPLE | ELONGATION @ BREAK (%) | TENSILE @ BREAK (psi) |
|---|---|---|
| 75%A:25%B | 157 | 960 |
| 50%A:50%B | 223 | 1170 |
| 25%A:75%B | 452 | 1504 |
| C | 182 | 2118 |
| 75%A:25%C | 94 | 983 |
| 50%A:50%C | 138 | 1391 |
| 25%A:75%C | 214 | 1805 |

Tensile strength at break can be improved above that for A alone by blending either B or C prepolymers. A similar trend is observed for elongated at break. Thus, prepolymer A appears to provide a lower $T_g$ than with blending, but tensile properties are improved with blending.

Viscosity of the prepolymers was measured using a Brookfield viscometer equipped with a thermostatted sample cell. The prepolymer was placed into the cell at 30° C. and viscosity was measured at 10° C. increments up to 100° C. or even up to 120° C. in some cases. Shear rate was varied to keep percent torque between 40–100% range. It is realized viscosity is shear rate dependent and accordingly these numbers show approximate viscosity over a large temperature and viscosity range. Shear rates varied between 0.3 and 6 rpm. Results are set forth in Table 6.

TABLE 6

Viscosity Versus Temperature Data

| | Estimated Brookfield Viscosity (cps) | | | | | | | | |
|---|---|---|---|---|---|---|---|---|---|
| Sample | 30° C. | 40° C. | 50° C. | 60° C. | 70° C. | 80° C. | 90° C. | 100° C. | 110° C. |
| 60% A:40% B | 174000 | 68250 | 30700 | 16200 | 8920 | 5150 | 3360 | 2400 | 1750 |
| B | | 128000 | 39700 | 14800 | 6130 | 3100 | 1660 | 970 | 641 |
| 75% A:25% C | 86800 | 39300 | 20500 | 11700 | 7150 | 4690 | 3220 | 2320 | |
| 40% A:60% C | 99900 | 48400 | 23000 | 12800 | 7380 | 4710 | 3170 | 2350 | 2020 |
| 25% A:75% C | 90200 | 57400 | 31200 | 15100 | 8500 | 5210 | 3500 | 2500 | |
| 10% A:90% C | 172000 | 69500 | 32400 | 16700 | 9300 | 5830 | 3820 | 2700 | 2400 |
| C | 99500 | 39200 | 18400 | 9750 | 5630 | 3510 | 2240 | 1490 | |

Viscosity versus temperature is a very important property for adhesive applications as lower viscosity is desired for impregnation. Higher temperatures provide lower viscosity but also reduce potlife. This information shows that at higher temperatures, all three prepolymers have suitable viscosities for impregnation. At lower temperatures, prepolymer A and prepolymer C are lower in viscosity; however, prepolymer B achieves the lowest viscosity of all at higher temperatures.

EXAMPLE 7

Adhesion Between Polyester Fabric Impregnated with Polybutadiene-Toluene Diisocyanate (TDI) Prepolymers Chain Extended with 3,5-Dimethylthio-2,4-Toluenediamine and Neoprene A woven polyester fabric formed of untreated polyester cords (composed of 3 plies, each ply approximately 400 fibers, approximately 25 microns in diameter, total cord about diameter =0.03") was cut into 2"×14" sections. The impregnant (prepolymers A, B, or C, or blend thereof plus diamine) was heated to 100° C. (at application, impregnant temperature is estimated to be 70–90° C.) and then spread out on the tape with a tongue depressor. Adhesive is applied to both side of the tape with minimal excess (tapes wiped as clean as possible with tongue depressor). The tapes were then oven dried 40 minutes at 320° F. A single coat of a solvent-based covercoat or adhesive commercially available from Lord Corporation as Chemlok 233C (CH233X) was applied to the dried/cured impregnant coated tape. Following a 30 minute air dry, the tapes were oven dried 30 minutes at 250° F.

The 14" tape was cut in half to provide 2 tape samples. Neoprene elastomer used was milled to a thickness of 0.03" (0.75 mm) and was cut into pieces slightly longer and wider than the tapes. Specimens were built layering rubber-tape-rubber-tape-rubber. Specimens were molded 30 minutes at 320° F. in a bladder mold with 80 psi pressure.

Specimens bonded above were cut lengthwise to harvest the center 1" wide strip (5"+in length). The sandwich was pulled apart by gripping rubber-tape and rubber-tape-rubber into grips on a tensile tester (a non-adhesive spacer is used during preparation to separate layers for testing). Pull rate was 20 inches per minute. Peak load, average load, percent rubber retention, and failure mode were recorded. Test results using solvent based adhesive CH233X are set forth below in Table 7.

TABLE 7

| Composition | Peak Load (psi) | Ave. Load (psi) | Failure Mode |
| --- | --- | --- | --- |
| 100%A | 43 | 35 | 80R-IF |
| 75%A:25%B | 58 | 47 | 100R |
| 60%A:40%B | 55 | 47 | 100R |
| 50%A:50%B | 50 | 41 | 100R |
| 25%A:75%C | 57 | 42 | 100R |
| 100%B | 44 | 43 | 100R |
| 90%A:10%C | 37 | 27 | 70R-CP |
| 75%A:25%C | 43 | 35 | 100R |
| 50%A:50%C | 50 | 44 | 100R |
| 25%A:75%C | 45 | 38 | 100R |
| 10%A:90%C | 47 | 39 | 100R |
| 100%C | 53 | 42 | 100R |

R = Rubber Failure; IF = Impregnant to Fiber Failure; CP = Covercoat to Impregnant Failure modes included the following: R (rubber); IF (impregnant to fiber failure); and CP (covercoat to impregnant failure). R is a desirable failure mode that indicates the bond strength is equal to that of the elastomer, but that the elastomer fails internally at a constant rate. IF and CP are less preferred failure modes. IF indicates that the weakest link in the rubber/fabric composite is the bond between the impregnant and the fibers, and CP indicates that the weakest link in the rubber/fabric composite is the bond between the covercoat and the vulcanized elastomer.

Impregnant A by itself does not appear to provide 100% rubber tearing bonds with CH-233X as the covercoat in these specific examples, although close to this. The failure mode appears to be between the impregnant and polyester fibers (IF=impregnant to fiber). It is further shown in these examples that both impregnants B and C provide 100% rubber tearing bonds with CH-233X as the overcoat. Blends of these prepolymers with Impregnant A produce viable impregnating adhesives.

Sample prepared as described in this example were also prepared, except substituting the solvent based adhesive CH-233X with an aqueous based adhesive or covercoat commercially available from Lord Corporation. In this example, the aqueous based adhesive was prepared and was used within 4 hours of preparation. Typically, the overcoat is applied in a single coat and dried it the same as CH-233X. However, similar performance was observed in these examples with double covercoat dips, and various drying methods. The results are set forth in Table 8 below.

TABLE 8

| Composition | Peak Load (psi) | Ave. Load (psi) | Failure Mode |
| --- | --- | --- | --- |
| 100%A | 27 | 17 | 10R-CP |
| 75%A:25%B | 43 | 35 | 80R-IF |
| 90%A:10%C | 50 | 42 | 90R-IF |
| 25%A:75%C | 46 | 38 | 100R |
| 100%C | 44 | 40 | 100R |

Similar to the example with solvent-based covercoats, impregnant A alone does not provide 100% rubber retention; however, blending in impregnant B or impregnant C improves adhesion. These examples show there is a fairly large window of polyol blends which provide excellent adhesion.

The foregoing examples are illustrative of the present invention, and are not to be construed as limiting thereof.

That which is claimed:

1. A polyurethane composition comprising the reaction product of:
   a polyurethane prepolymer component comprising:
   (a) about 50 to about 99 percent by weight of at least one isocyanate-terminated polyalkadiene prepared by capping hydroxyl groups of a hydroxyl-terminated polyalkadiene having a number average molecular weight from about 1500 to about 5000 grams per mol (g/mol) with capping isocyanate; and
   (b) about 1 to about 50 percent by weight of at least one additional isocyanate-terminated polyalkadiene prepared by capping hydroxyl groups of a hydroxy-terminated polyalkadiene having a number average molecular weight from about 500 to about 1500 g/mol with capping isocyanate wherein said hydroxy-terminated polyalkadienes of paragraphs (a) and (b) do not have the same molecular weight and the weight percents are based on total weight of the prepolymer; and
   a curative component.

2. The polyurethane composition of claim 1, wherein said at least one isocyanate-terminated polyalkadiene of paragraph (a) and said at least one additional isocyanate-terminated polyalkadiene of paragraph (b) comprise polyalkadienes selected from the group consisting of homopolymers of conjugated dienes, copolymers of conjugated dienes with a comonomer, and mixtures thereof.

3. The polyurethane composition of claim 1, wherein each of said isocyanate-terminated polyalkadienes of paragraphs (a) and (b) are unsaturated.

4. The polyurethane composition of claim 1, wherein each of said isocyanate-terminated polyalkadienes of paragraphs (a) and (b) are saturated.

5. The polyurethane composition of claim 2, wherein said at least one isocyanate-terminated polyalkadiene of paragraph (a) and said at least one additional isocyanate-terminated polyalkadiene of paragraph (b) comprise polybutadiene.

6. The polyurethane composition of claim 1, wherein said at least one isocyanate-terminated polyalkadiene of paragraph (a) and said at least one additional isocyanate-terminated polyalkadiene of paragraph (b) comprise hydroxy-terminated polyalkadiene reacted with polyisocyanate selected from the group consisting of toluene diisocyanate (TDI), 1,5-naphthalene diisocyanate, phenylene diisocyanate, diphenyl methane diisocyanate (MDI), xylene diisocyanate, isophorone diisocyanate (IPDI), and mixtures thereof.

7. The polyurethane composition of claim 6, wherein said at least one isocyanate-terminated polyalkadiene of paragraph (a) and said at least one additional isocyanate-terminated polyalkadiene of paragraph (b) comprise hydroxy-terminated polyalkadiene reacted with toluene diisocyanate (TDI).

8. The polyurethane composition of claim 7, wherein TDI is 2,4 isomer of TDI.

9. The polyurethane composition of claim 1, wherein:
said at least one isocyanate-terminated polyalkadiene of paragraph (a) is an isocyanate-terminated polybutadiene prepared by capping hydroxy-terminated polybutadiene having a molecular weight of at least about 2500 g/mol with toluene diisocyanate (TDI); and
said at least one additional isocyanate-terminated polyalkadiene of paragraph (b) is prepared by capping hydroxy-terminated polybutadiene having a molecular weight of at least about 1000 g/mol with toluene diisocyanate (TDI).

10. The polyurethane composition of claim 1, wherein said curative component comprises at least one aromatic diamine.

11. The polyurethane composition of claim 10, wherein said aromatic diamine is selected from the group consisting of 3,5-dimethylthio-2,4-toluene diamine, 4,4'-methylene-bis(2-chloroaniline), 1,3-trimethylene glycol-(p-amino benzoate), 1,2-bis(2-amino-phenyl thioethane), 4,4'-methylene dianiline, 4,4'-methylene-bis(3-chloro-2,6-diethylaniline, 2,6-dichloro-p-phenylene diamine, 2,6-dibromo-p-phenylene diamine, polytetramethyleneoxide-di-p-aminobenzoate and mixtures thereof.

12. The polyurethane composition of claim 11, wherein said aromatic diamine is 3,5-dimethylthio-2,4-toluene.

13. A polyurethane adhesive composition comprising the reaction product of:

a polyurethane prepolymer component comprising:
(a) about 95 to about 75 percent by weight, based on the total weight of the polyurethane prepolymer component, of at least one isocyanate-terminated polyalkadiene prepared by capping hydroxyl groups of a hydroxy-terminated polybutadiene having a number average molecular weight from about 1500 to about 5000 grams per mol (g/mol) with toluene diisocyanate; and
(b) about 5 to about 25 percent by weight, based on the total weight of the polyurethane prepolymer component, of at least one additional isocyanate-terminated polyalkadiene prepared by capping hydroxyl groups of a hydroxy-terminated polybutadiene having a number average molecular weight from about 500 to about 1500 g/mol with toluene diisocyanate wherein said hydroxy-terminated polyalkadienes of paragraphs (a) and (b) do not have the same molecular weight; and a curative component comprising at least one aromatic diamine.

14. A multipack adhesive comprising a first and second package adhesive system, said packages being mixed together at the time of use to provide a polyurethane adhesive, the first package comprising about 50 to about 99 percent by weight of at least one isocyanate-terminated polyalkadiene prepared by capping hydroxyl groups of a hydroxyl-terminated polyalkadiene having a number average molecular weight from about 1500 to about 5000 grams per mol (g/mol) with isocyanate; and about 1 to about 50 percent by weight of at least one additional isocyanate-terminated polyalkadiene prepared by capping hydroxyl groups of a hydroxyl-terminated polyalkadiene having a number average molecular weight from about 500 to about 1500 grams per mol (g/mol) with isocyanate wherein said hydroxy-terminated polyalkadienes do not have the same molecular weight and the weight percents are based on total weight of the prepolymer; and the second package comprises a curative component.

15. The multipack adhesive of claim 14, wherein said first package comprises:
about 95 to about 75 percent by weight, based on the total weight of the first package, of at least one isocyanate-terminated polyalkadiene prepared by capping hydroxy-terminated polybutadiene having a molecular weight of at least about 2500 grams per mol (g/mol) with toluene diisocyanate; and about 5 to about 25 percent by weight, based on the total weight of the first package, of at least one additional isocyanate-terminated polyalkadiene prepared by capping hydroxy-terminated polybutadiene having a molecular weight of at least about 1000 g/mol with toluene diisocyanate; and
wherein said second package comprises at least one aromatic diamine.

* * * * *